June 30, 1925.
C. SPRAGUE
HACK SAW FRAME
Filed June 28, 1923
1,544,495
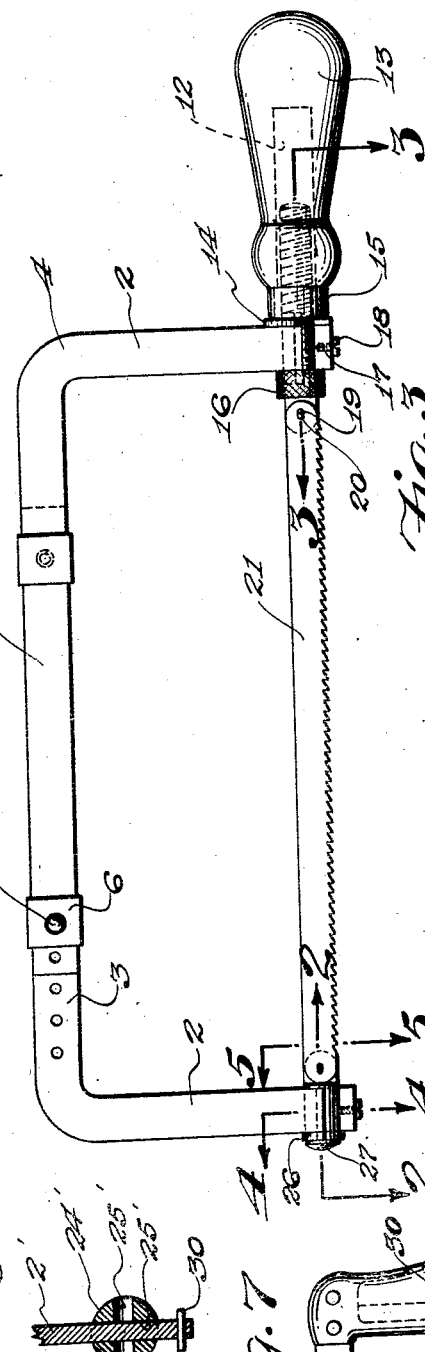
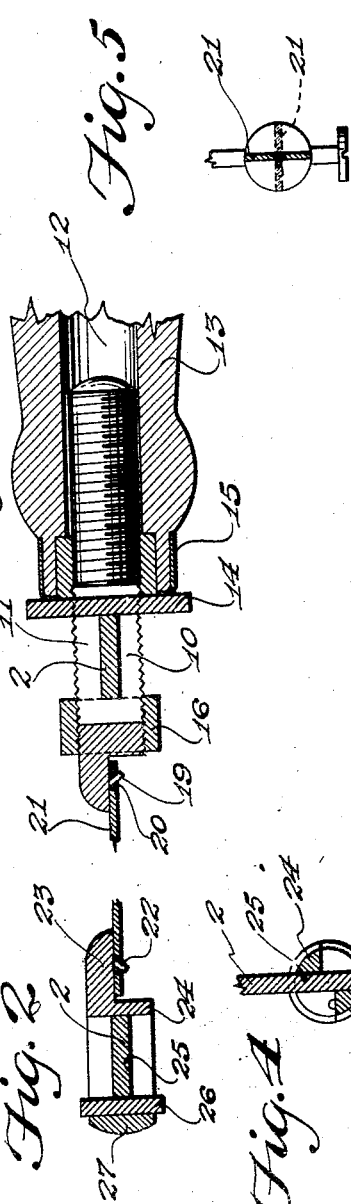
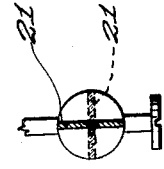
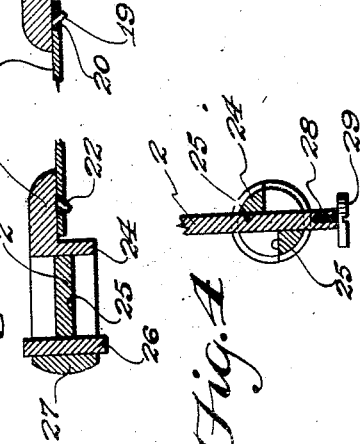
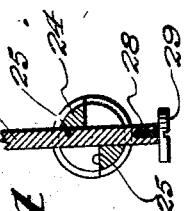
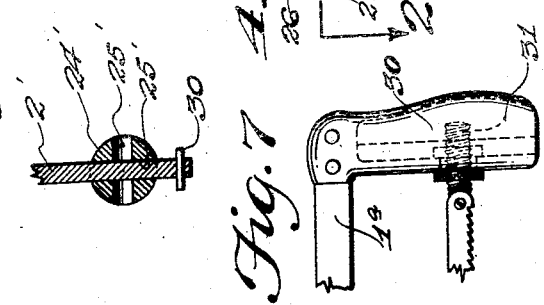
CLIFFORD SPRAGUE
INVENTOR
BY Victor J. Evans
ATTORNEY Patented June 30, 1925.

1,544,495

UNITED STATES PATENT OFFICE.

CLIFFORD SPRAGUE, OF NEDERLAND, COLORADO.

HACK-SAW FRAME.

Application filed June 28, 1923. Serial No. 648,335.

*To all whom it may concern:*

Be it known that I, CLIFFORD SPRAGUE, a citizen of the United States, residing at Nederland, in the county of Boulder and State of Colorado, have invented new and useful Improvements in Hack-Saw Frames, of which the following is a specification.

This invention relates to hack saws, and an object of the invention is to provide a hack saw in which the sawing blade may be positioned in the ordinary position parallel with the back of the frame or may be positioned transversely to its normal position for lateral sawing.

In many instances, sawing work is necessary which is practically inaccessible by an ordinary approved type of hack saw and also it is frequently desired to cut substantially square openings in rigidly mounted boards or the like and such sawing work is materially facilitated by the provision of saw supporting means adjustably carried by the frame of the saw in such manner as to permit quick and easy adjustment of the saw blade from its normal position into a horizontal or transverse position.

Another object of the invention is to provide a hack saw and frame as specified which is comparatively simple in construction, in which the necessary adjustments may be quickly and easily made to accommodate saws of different lengths and also to provide a hack saw frame which may be manufactured at a comparatively low cost.

Other objects of the invention will appear in the following detailed description taken in connection with the accompanying drawings wherein:—

Fig. 1 is a side elevation of the improved hack saw showing a blade associated therewith.

Fig. 2 is a detail longitudinal section on the line 2—2 of Fig. 1.

Fig. 3 is a detail section on the line 3—3 of Fig. 1.

Fig. 4 is a detail section on the line 4—4 of Fig. 1.

Fig. 5 is a detail section taken on the line 5—5 of Fig. 1 and showing the saw blade in its normal position, in solid lines and in its transversely adjusted position, in dotted lines.

Fig. 6 is a detail section through a modified form of the invention.

Fig. 7 is a fragmentary detail view of a modified form of the invention showing a pistol grip handle for the saw frame.

Referring more particularly to the drawings, the improved hack saw includes the back or frame 1, which is substantially U shaped and has parallel legs 2. As is usual in the construction of adjustable hack saw frames the frame or back 1 is constructed of two sections namely the section 3 and the section 4 which are adjustably connected and held in adjusted positions by means of a thumb screw 5 which is carried by a guiding collar 6.

The handle carrying leg 2 extends diametrically through a bolt 10, which bolt is provided with two transversely extending diametrical slots 11, and the bolt is cut away at opposite sides of its axis and the slots for substantially one-fourth of its body, as shown in Fig. 3 of the drawings, so as to permit the leg 2 to be quickly inserted through the bolt. The bolt extends into a recess 12 formed in the handle 13 and it threads through a threaded disc like nut 14 which abuts the ferrule 15. The ferrule 15 is mounted upon the handle 13, as clearly shown in Figs. 1 and 3 of the drawings. A clamping nut 16 is threaded upon the bolt 10 and is adapted to clamp against one edge of the leg 2 and tightly force the leg against the nut 14 for securely connecting the handle 13 to the frame 1 in such manner that it may be quickly and easily detached therefrom. A set screw 17 which has a relatively large head 18 is threaded into the end of the leg 2 and the head 18 has a diameter greater than the thickness of the leg, and also than the width of the slot 11 so as to prevent the bolt 10 and the handle 13 from falling off the leg 2 when the clamping nut 16 is not in clamping position. The outer end of the bolt 10 is flattened and has a tongue 19 formed thereon which is adapted to be inserted through the opening 20 in one end of the saw blade 21 to permit attachment of the saw blade to the bolt.

The opposite end of the saw blade 21 from that which is attached to the bolt 10, is connected or attached by means of a tongue 22 to the flat end 23 of a member 24. The member 24 is provided with diametrically extending slots 25 which extend at right angles to each other, and the member 24, like the bolt 10 is cut away at diagonally opposite places, for substantially one-fourth of its body, as clearly shown in Fig. 4 of the drawings.

A washer 26 is provided which is likewise cut, and it fits between the outer end 27 of the member 24 and the facing edge of the leg 2 of the frame 1, which is inserted through one of the slots 25. The leg 2 has a set screw 28 threaded into its lower end, the head 29 of which has a diameter greater than the thickness of the leg and also greater than the width of the slot 25 so as to prevent the member 24 from falling off the leg 2.

The cutting away of the substantially two quarters of the member 24 and the bolt 10, at diagonally opposite portions of this member and bolt will permit quick adjustment of the saw blade 21 from its normal position parallel with the back 1 of the saw frame, as shown in Fig. 5 of the drawings in solid lines, into horizontal position transversely of the saw frame as shown in dotted lines in Fig. 5 of the drawings.

In Fig. 6 of the drawings a slight modification of the invention is shown in which the member 24' which corresponds to the member 24 and which member also corresponds to the bolt 10 is shown as provided with a pair of diametrically extending slots 25' which are disposed at right angles one to the other and which are adapted to receive the leg 2' therethrough. A pin 30 is inserted through the leg to prevent the member 24' from falling off the leg when the blade is not properly tightened.

In the modified form shown in Fig. 6 of the drawings, it will be necessary to remove the member 24' from off the end 2' of the frame to turn it to position the saw horizontally.

In Fig. 7 of the drawings, the further modified form of the invention is shown, which is designed to adapt the saw frame to the use of a pistol grip, as indicated at 30. The pistol grip 30 is connected in any approved manner to the back 1ª of the saw frame and the saw blade carrying bolt 31 threads into the pistol grip.

From the foregoing description taken in connection with the accompanying drawings it will be apparent that the saw blade 21 may be easily and quickly mounted in position, and connected to the tongues 19 and 22 prior to the connection of the saw blade to the tongues, the frame 1 is adustable to substantially fit the saw blade after which the blade is tightened by turning the handle, to securely tighten the saw blade after which the leg 2 is tightly clamped in position by adjustment of the nut 16. When it is desired to adjust the position of the saw blade into horizontal from a vertical position or vice versa, the handle is rotated to release the tension of the saw slightly, and the bolt 10 and member 24 are turned a half turn causing abutment of the walls formed by the cutting away of the bolt and member against the ends 2 of the saw frame, after which the bolt is again tightened to tension the saw blade and hold it securely in horizontal sawing position.

It is, of course, to be understood that the invention may be constructed in other manners and the parts associated in different relations and, therefore, I do not desire to be limited in any manner except as set forth in the claims hereunto appended.

Having thus described my invention what I claim is:—

1. A hack saw frame including a back having parallel legs, a bolt provided with a diametrically extending opening adapted to receive one of said legs therethrough, means on said bolt for clamping against the edges of the leg, a substantially cylindrical member provided with a diametrically extending opening adapted to receive the other leg of the frame, and saw connecting means carried by said bolt and member.

2. A hack saw frame comprising a substantially U shaped back having parallel legs, a handle, a bolt adjustable relative to said handle and provided with a pair of diametrically extending openings adapted to receive one of said legs therethrough, a clamping nut adjustable on said bolt for clamping engagement with said leg, a member provided with a pair of diametrically extending openings disposed at right angles to each other and adapted to receive the other of said legs therethrough, and saw connecting means carried by said bolt and member.

3. A hack saw frame comprising a substantially U shaped back having parallel legs, a handle, a bolt adjustable relative to said handle and provided with a pair of diametrically extending openings adapted to receive one of said legs therethrough, a clamping nut adjustable on said bolt for clamping engagement with said leg, a member provided with a pair of diametrically extending openings disposed at right angles to each other and adapted to receive the other of said legs therethrough, saw connecting means carried by said bolt and member, and means carried by said legs for preventing the bolt or member from falling off the ends of the legs.

4. A hack saw frame comprising a substantially U shaped back having parallel legs, a handle, a bolt adjustable relative to said handle and provided with a pair of diametrically extending openings adapted to receive one of said legs therethrough, a clamping nut adjustable on said bolt for clamping engagement with said leg, a member provided with a pair of diametrically extending openings disposed at right angles to each other and adapted to receive the other of said legs therethrough, saw connecting means carried by said bolt and member, means carried by said legs for preventing the bolt or member from falling off the ends of the legs, and a clamping washer carried by said member for clamping engagement with the frame leg engaged through the member.

In testimony whereof I hereby affix my signature.

CLIFFORD SPRAGUE.